United States Patent
Abe et al.

(10) Patent No.: US 8,436,920 B2
(45) Date of Patent: *May 7, 2013

(54) CAMERA APPARATUS WITH MAGNIFIED PLAYBACK FEATURES

(75) Inventors: Tatsuro Abe, Ome (JP); Kuniaki Takahashi, Fukaya (JP); Tatsuhiko Ikehata, Ome (JP); Shiro Nagaoka, Ome (JP); Kei Tashiro, Ome (JP); Tsuyoshi Hagiwara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 13/010,287

(22) Filed: Jan. 20, 2011

(65) Prior Publication Data
US 2011/0115948 A1    May 19, 2011

Related U.S. Application Data

(63) Continuation of application No. 11/393,876, filed on Mar. 31, 2006, now Pat. No. 7,898,580.

(30) Foreign Application Priority Data

Mar. 31, 2005  (JP) ................................. 2005-104426

(51) Int. Cl.
*H04N 5/262* (2006.01)
*H04N 5/222* (2006.01)

(52) U.S. Cl.
USPC ............... 348/240.2; 348/333.03; 348/333.12

(58) Field of Classification Search ............... 348/240.2, 348/240.99, 240.1, 333.03, 333.05, 333.11, 348/333.12, 333.02

See application file for complete search history.

(56) References Cited

U.S. PATENT DOCUMENTS

| 5,754,230 | A   | 5/1998  | Tsuruta |
|-----------|-----|---------|---------|
| 6,757,008 | B1* | 6/2004  | Smith ........................... 348/143 |
| 7,057,658 | B1  | 6/2006  | Shioji et al. |
| 7,212,232 | B2* | 5/2007  | Iijima ........................ 348/220.1 |
| 7,245,441 | B2  | 7/2007  | Wu et al. |
| 7,250,968 | B2* | 7/2007  | Ito ............................... 348/240.2 |
| 7,298,409 | B1  | 11/2007 | Misawa |
| 7,456,883 | B2  | 11/2008 | Yoo et al. |
| 7,492,406 | B2  | 2/2009  | Park et al. |
| 2001/0012072 | A1 | 8/2001 | Ueno |
| 2003/0160886 | A1 | 8/2003 | Misawa et al. |
| 2004/0008210 | A1 | 1/2004 | Ikehata |

(Continued)

FOREIGN PATENT DOCUMENTS

| JP | 01-272268 | 10/1989 |
| JP | 05-103278 | 4/1993  |

(Continued)

*Primary Examiner* — John Villecco
(74) *Attorney, Agent, or Firm* — Pillsbury Winthrop Shaw Pittman, LLP

(57) ABSTRACT

An embodiment of a camera apparatus includes transferring a compressed playback streaming signal output from a recording medium to a map defined in a memory circuit, decoding the transferred playback streaming signal by a decoder, converting the decoded signal to a YUV signal in an image processing unit, transferring the converted signal to the map as a YUV signal, generating a magnified or reduced image from the YUV signal in the image processing unit, and storing the image on the map, overlaying a magnified or reduced image prepared on the map according to a magnified playback request, and outputting the overlaid image for seeking an output position.

17 Claims, 4 Drawing Sheets

U.S. PATENT DOCUMENTS

| | | |
|---|---|---|
| 2004/0027464 A1 | 2/2004 | Iijima |
| 2006/0038908 A1 | 2/2006 | Yoshino |
| 2006/0238627 A1 | 10/2006 | Hagiwara et al. |
| 2008/0079754 A1* | 4/2008 | Kuroki .......................... 345/660 |
| 2009/0153649 A1 | 6/2009 | Hirooka et al. |
| 2010/0002071 A1 | 1/2010 | Ahiska |
| 2010/0145630 A1* | 6/2010 | Ball et al. ........................ 702/31 |
| 2010/0149402 A1 | 6/2010 | Aoki et al. |

FOREIGN PATENT DOCUMENTS

| | | |
|---|---|---|
| JP | 07-336622 | 12/1995 |
| JP | 10-340075 | 12/1998 |
| JP | 10336494 A * | 12/1998 |
| JP | 2001-128055 | 5/2001 |
| JP | 2002-209189 | 7/2002 |
| JP | 2002-354299 | 12/2002 |
| JP | 2003-046814 | 2/2003 |
| JP | 2003-274335 | 9/2003 |
| JP | 2004-023632 | 1/2004 |
| JP | 2004-048229 | 2/2004 |
| JP | 2004-072207 | 3/2004 |
| JP | 2004-072684 | 3/2004 |
| JP | 2004-121652 | 4/2004 |

* cited by examiner

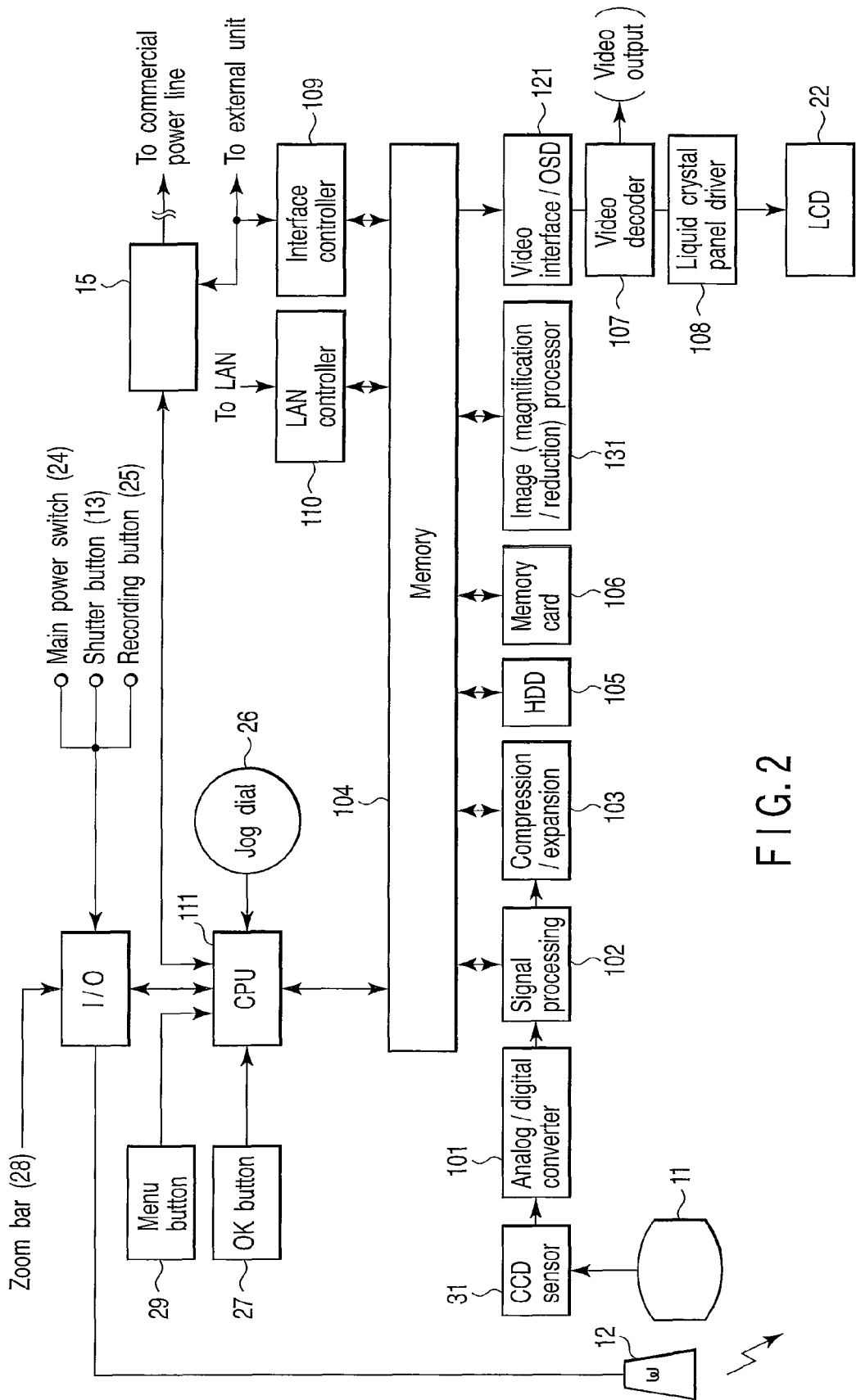
F I G. 2

CAMERA APPARATUS WITH MAGNIFIED PLAYBACK FEATURES

CROSS-REFERENCE TO RELATED APPLICATIONS

This application is a continuation of U.S. application Ser. No. 11/393,876, filed Mar. 31, 2006 now U.S. Pat. No. 7,898,580, and for which priority is claimed under 35 U.S.C. §120. This application is based upon and claims the benefit of priority from Japanese Patent Application No. 2005-104426, filed Mar. 31, 2005, the entire contents of all applications are incorporated herein by reference in their entireties.

BACKGROUND

1. Field

One embodiment of the invention relates to a camera apparatus which can display a magnified or reduced image during playback, and in particular, a desired part of a still or moving image taken by a camera apparatus such as an electronic camera.

2. Description of the Related Art

A camera apparatus can record still and moving images in a recording medium, such as a semiconductor memory (a memory card) and a hard disc unit.

A taken image is displayed (played back) in a liquid crystal display provided integrally with a camera apparatus, a display unit capable of displaying a video signal, that is, a display unit used in a personal computer, or an ordinary television set, by the user by operating the camera apparatus.

Nowadays, as a camera apparatus and a large-screen television (monitor) have become widespread, partially magnified playback of a recorded image is widely demanded by the user.

Japanese Patent Application Publication (KOKAI) No. 2004-48229 discloses a display control method that is used when displaying a magnified still image in a digital still camera.

However, the Publication 2004-48229 mentions only display of a magnified still image and operations for it, and does not mention magnification or reduction of a desired part of a moving image during playback.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary diagram showing a control system of the camera apparatus according to an embodiment of the invention shown in the FIGS. 1A and 1B;

DETAILED DESCRIPTION

Various embodiments according to the invention will be described hereinafter with reference to the accompanying drawings. In general, according to one embodiment of the invention, an embodiment of a camera apparatus includes transferring a compressed playback streaming signal output from a recording medium to a map defined in a memory circuit, decoding the transferred playback streaming signal by a decoder, converting the decoded signal to a YUV signal in an image processing unit, transferring the converted signal to the map as a YUV signal, generating a magnified or reduced image from the YUV signal in the image processing unit, and storing the image on the map, overlaying a magnified or reduced image prepared on the map according to a magnified playback request, and outputting the overlaid image for seeking an output position.

Figure 1A:
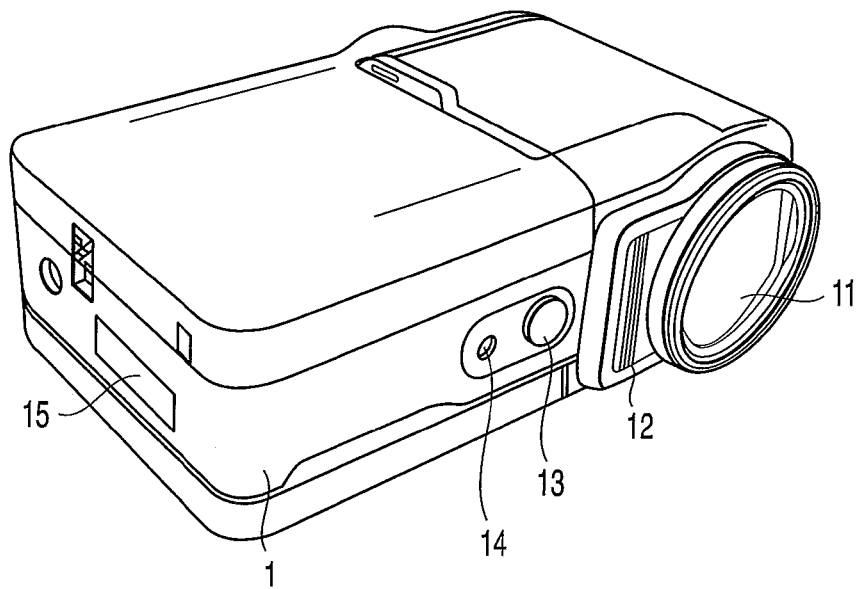
FIGS. 1A and 1B are exemplary diagrams each showing an example of a camera apparatus capable of recording still and moving images and voices, according to an embodiment of the invention.
Figure 1B:
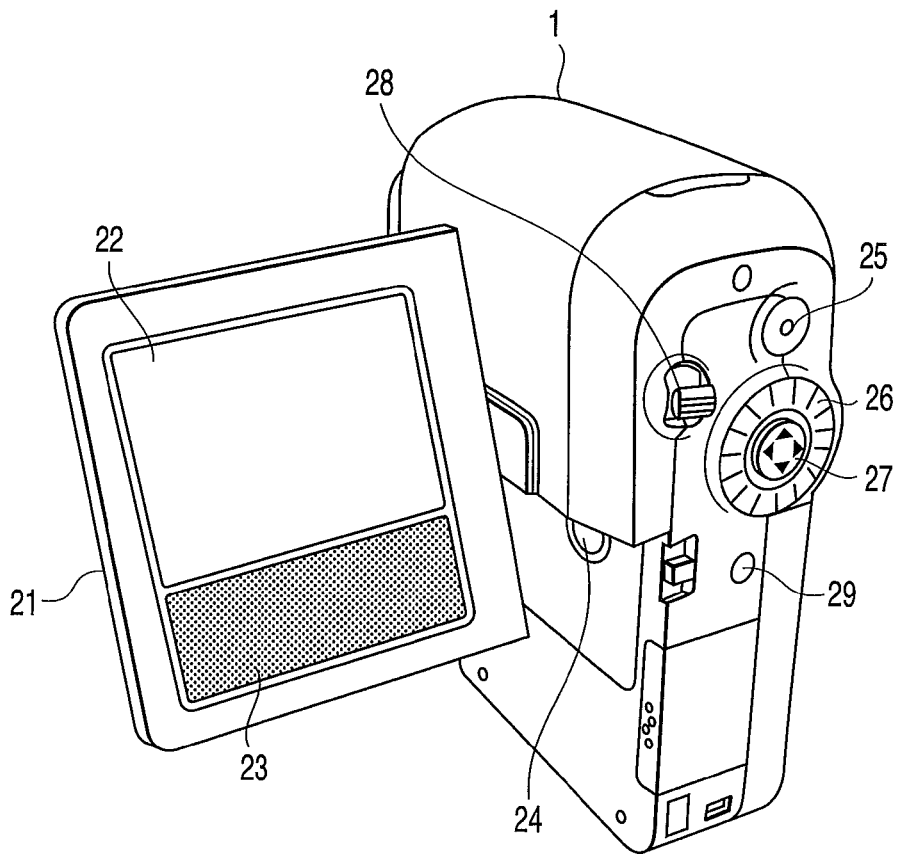

FIGS. 1A and 1B show schematic illustrations of an electronic camera apparatus capable of recording still and moving images and sound, to which an embodiment of the present invention is applicable.

FIG. 1A shows an electronic camera apparatus (an image pickup unit) 1 viewed from the camera lens side. The electronic camera apparatus 1 has a camera lens 11, a flash 12, a shutter button 13 (for a still image), and a remote control receiver 14. The camera apparatus 1 also has an adapter connector (a connection terminal) 15 used for connection with a personal computer and an external power supply (a charger).

FIG. 1B shows the electronic camera apparatus 1 viewed from the opposite side of the camera lens 11.

The electronic camera apparatus 1 has a liquid crystal monitor (LCD panel) 22 and a speaker 23 provided integrally with a frame 21 functioning also as a main power switch. The electronic camera apparatus 1 also has a main power switch 24 at a fixed position, which is turned off at the position where the frame 21 is closed (housed at a fixed position of the main body of the electronic camera).

The electronic camera apparatus 1 has a record button 25 capable of inputting instructions (commands) to start and stop recording a moving image, a jog (JOG) dial 26 capable of inputting instructions (control commands) to input operation modes and conditions and select decisions, a set (OK) button 27 capable of inputting an instruction (a control command) to determine (execute) the instruction selected (guided) by the jog dial 26, a zoom bar 28 capable of inputting a control signal for zoom operation to change the angle of an image (the angle to take a picture of a subject) to be taken by the camera lens 11, and a menu button 29 used to input a control command to display a menu screen.

FIG. 2 shows an example of a control system of the electronic camera apparatus shown schematically in FIGS. 1A and 1B.

A subject image taken by the camera lens 11 is focused on an image forming plane of the image pickup element 31, or a CCD sensor, for example, and converted to an analog signal (taken image data).

The analog signal (taken image data) from the CCD sensor 31 is converted to a digital signal in an analog/digital (A/D) converter 101 controlled by a CPU (main control circuit) 111, and input to a camera signal processing circuit 102.

The camera signal processing circuit 102 performs gamma correction, color signal separation or white balance adjustment for the taken image data converted to a digital signal by the A/D converter 101.

The taken image data output from the camera signal processing circuit 102, or a recording image taken by the camera lens 11, is input to a liquid crystal panel driver (LCD Driver) 108, and displayed in an LCD panel 22 (hereinafter called LCD) mounted in the frame 21 (refer to FIG. 1B).

The taken image data output from the camera signal processing circuit 102 is compressed in a compression/expansion unit 103, when recording, and recorded in a main recording medium, for example, a hard disc unit 105 (hereinafter abbreviated as HDD) or an attached removable recording medium, for example, a memory card 106, or a nonvolatile memory.

The compression/expansion unit 103 compresses a still image by a known method such as JPEG, and a moving image (a non-still image) by MPEG. The memory card 106 may use a semiconductor memory called SD card (registered trademark) and Mini-SD (registered trademark).

When playing an image recorded in the HDD 105 or memory card 106, an image read from the HDD 105 or memory card 106 is expanded in the compression/expansion unit 103, and supplied to a video decoder 107 through a memory circuit 104. The image data supplied to the video decoder 107 is displayed in the LCD 22 through the liquid crystal panel driver 108.

A not-shown recording media interface is used for the transfer of data (compressed image) with the HDD 105 and memory card 106. A video interface (Video I/F) and OSD (On Screen Display) processor 121 are provided in the stage preceding the video decoder 107.

The video interface and OSD processor 121 is used to display a display frame or a sub-screen as explained later with reference to FIG. 3, when a magnified image of a desired part of an image displayed in the LCD 22 is displayed in a display frame or a sub-screen. An image overlaid through the OSD 121 is magnified or reduced by an image (magnification/reduction) processor 131.

Naturally, a not-shown work memory (called RAM or cache) is provided for processing image data, as firmware of the CPU 111, or as a part of the memory circuit 104, or as an external memory connected to the memory circuit 104.

Still image or moving image data recorded in the HDD 105 or memory card 106 can be transferred to a not-shown external unit, such as a personal computer (PC) and a video recorder. An interface controller 109 can be used for the transfer with an external unit. Naturally, a known standard, for example IEEE 1394, a parallel bus, a USB (Universal Serial Bus) can be used as an interface.

The interface controller 109 is inserted between an optional interface and the memory circuit 104. Naturally, a network (LAN) connected through a LAN controller 110 can be used for the transfer of data.

In the HDD 105 as a recording medium, according to the capacity, the recordable number of still images or the time to record moving images (the number of titles) reaches several 100 to several 1000. Thus, a high speed is demanded to feed the recorded images or titles forward and backward.

Therefore, the jog dial 26 and OK button 27 permit easy selection of many images or titles and setting of operation modes without hassle. (An easy-to-use switch such as the jog dial 26 is useful when specifying an image by continuously searching many images or titles.) The contents input by the jog dial 26 (by the user's operation), operation states of the camera apparatus 1, or display of the menu screen by the menu button 29 are combined through the CPU 111, memory circuit 104, image (magnification/reduction) processor 131, video interface and OSD 121, and displayed in the LCD 22.

The OK (set) button 27 gives the CPU 111 information that the button 27 is pressed (ON/OFF signal is input). Based on the ON/OFF signal input from the information (the button 27), the CPU 111 determines the image/title or mode selected by the jog dial 26, and plays the image/title or sets the mode.

The jog dial 26 sends the CPU (main control unit) 111 information about the rotation angle and speed. The CPU 111 controls the (next) image display speed based on this information.

The OK (set) button 27 is placed coaxially (concentrically) with the center of rotation of the jog dial 26. The OK (set) button 27 can input the above-mentioned ON signal when pressed substantially toward the center (in the axial direction), and can input a control command (instruction) to scroll an image displayed in the LCD 22 in the pressed direction, when pressed in one of four directions (generally called "up/down/left/right") dividing the circumference equally into four parts.

Displaying a magnified image of a specified part during playback of a still image has already been realized in most digital still cameras.

Further, as the part (position) of a whole image that is magnified becomes unclear when an image is magnified, a sub-screen or frame 22-302 is simultaneously displayed on the display screen 22-301 of the LCD 22, and a magnified position mark or frame 22-303 is displayed to indicate the magnified area.

However, when displaying a magnified image while playing a moving image, special playback techniques such as frame-advance or time-lapse (extract a display image at every certain time) from a paused state is requested in many cases. Namely, if a part of a display screen is magnified when playing a moving image, seamless playback becomes difficult.

This proposal enables magnified display and scroll of a moving image without losing the real-time property, that is, overlaying identifying information indicating a magnification changing part of an image on a moving image displayed in a display unit, providing a magnified image corresponding to the magnification changing part of the moving image displayed in the display unit, and changing the magnified image corresponding to the magnification changing part according to a relative position instructed to change when an instruction is given to change a magnification changing part displayed on the moving image displayed in the display unit and a relative position of the moving image displayed in the display unit.

Figures 3A, 3B:
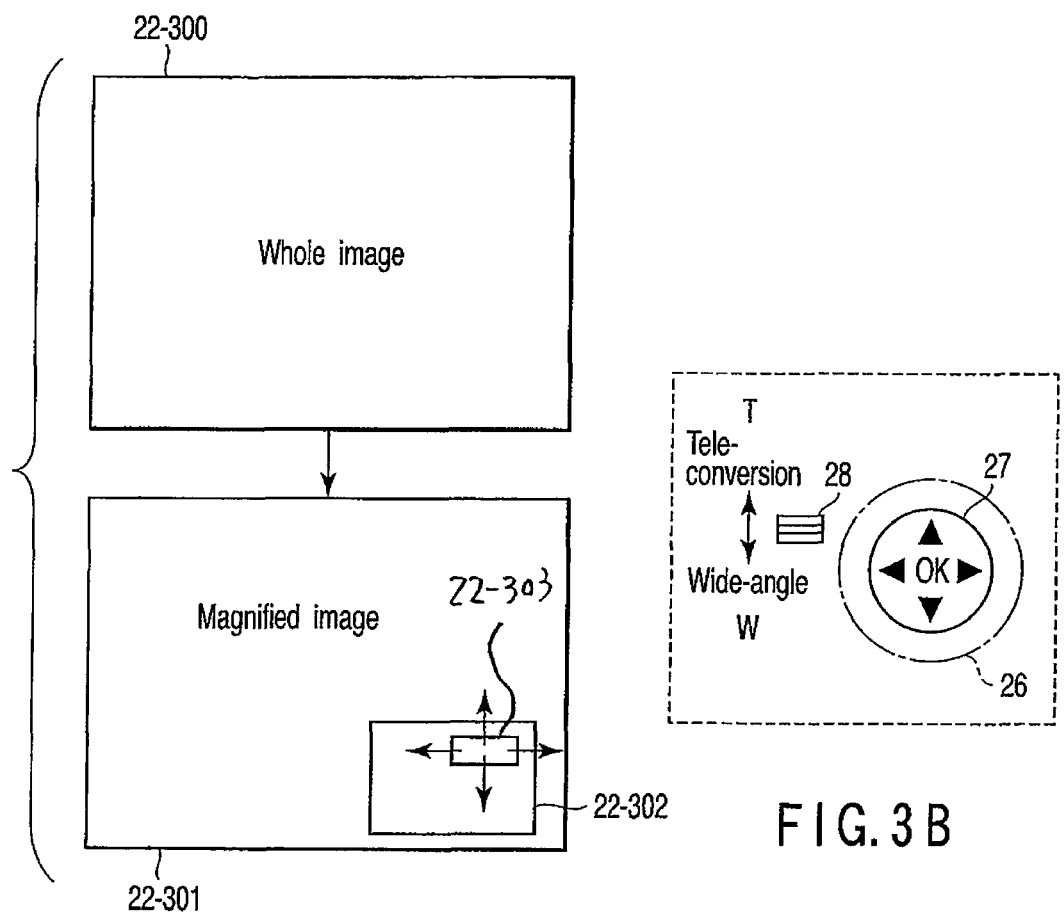
FIGS. 3A and 3B are exemplary diagrams each showing an example of a magnified image during playback of a moving image, setting of display position and magnification in the camera apparatus according to an embodiment of the invention shown in the FIGS. 1A, 1B and 2.

For example, as shown in FIG. 3A, when the zoom bar 28 of the camera apparatus 1 is moved to the T (Tele-conversion) side or W (Wide-angle) side during playback of an image with the whole image 22-300 of a playing image (moving image) being displayed in the LCD 22, the image displayed in the LCD 22 is changed to the whole image 22-301 of a magnified part. In the whole image 22-301 of the magnified part, a reduced whole image is simultaneously displayed within a sub-screen or frame 22-302. On the displayed reduced whole image 22-302, a magnify position mark or frame 22-303 indicating a magnifying area is overlaid.

When the user instructs (inputs) to move a magnifying area to one of the "up/down/left/right" directions by operating the OK button 27 while the magnified image is being displayed, the magnify position mark 22-303 is moved within the displayed reduced whole image 22-302.

Relating to the input of the instruction to move the magnify position mark 22-303, the image displayed in the magnified whole image 22-301 is scrolled.

The reduced whole image 22-303 and magnify position mark 22-303 are erased (returned to the not-overlaid state) simultaneously with the reset of the magnified display mode, when a certain time (e.g., 3 to 5 seconds) passes after the stop of the operation of the zoom bar 28 or OK button 27.

The above-mentioned partially magnified display during playback of a moving image is executed also in the state that playback of a moving image is temporarily stopped (paused). This improves the operability when specifying a magnifying image, or a magnifying object.

Further, when the zoom bar 28 is moved to the T side while a magnified image is being displayed (or subsequent to the operation of the zoom bar 28 during playback of an image), magnification (magnifying power) is increased. When the zoom bar 28 is moved to the W side, magnification is decreased. When magnification is increased to higher than a predetermined magnification (when the zoom bar 28 is moved to the T side), a magnifying image is temporarily created from an image with a maximum magnification or an image with a predetermined magnification among the transferable images, by pixel interpolation in an image (magnification/reduction) processing circuit explained below with reference to FIG. 4.

Figure 4:
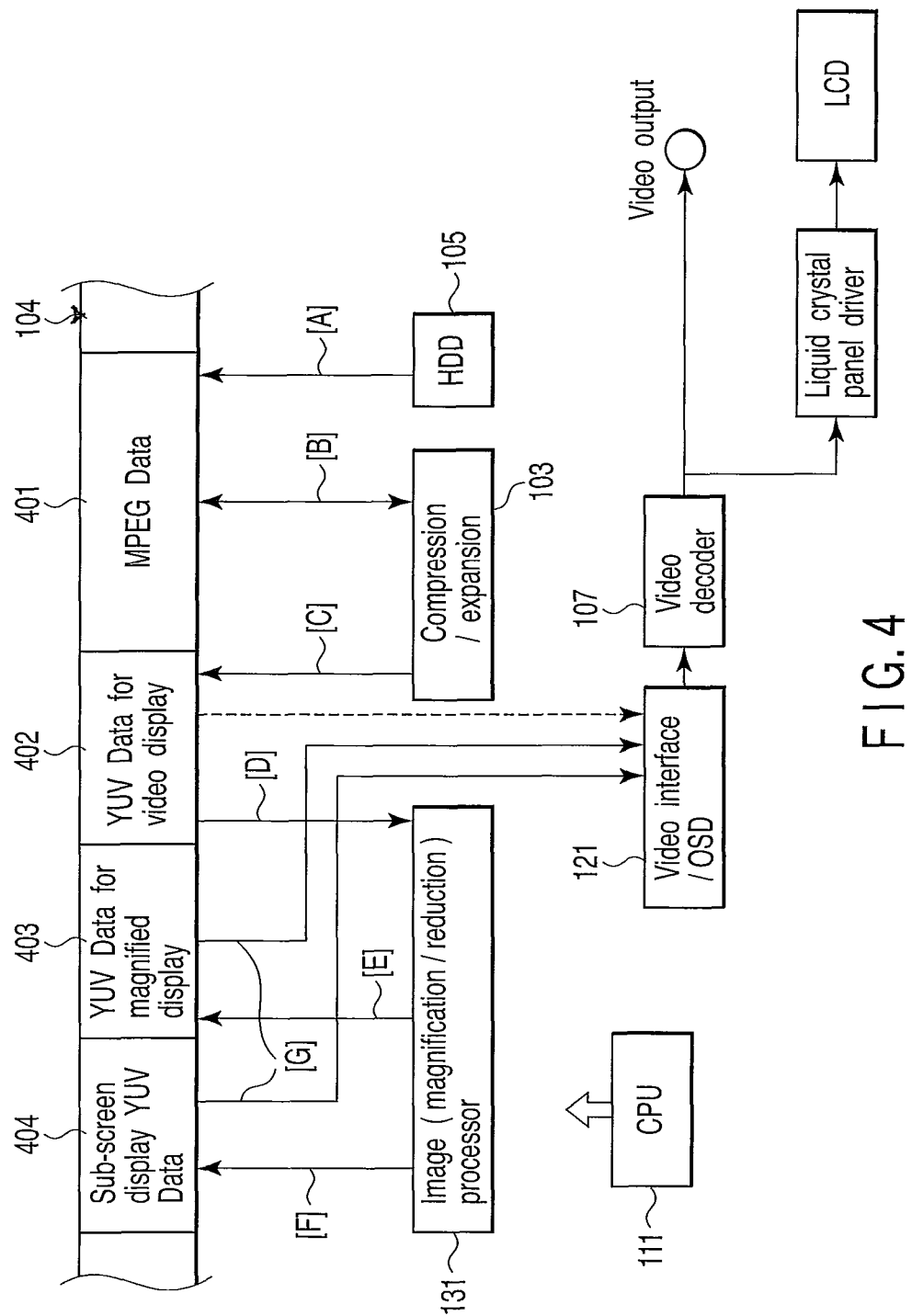
FIG. 4 is an exemplary diagram showing a signal processing system for displaying a magnified image and a reduced whole image during playback of a moving image in the camera apparatus according to an embodiment of the invention shown in the FIGS. 3A and 3B.

FIG. 4 shows the configuration and signal flow to enable magnified display of a desired part of an image during playback of a moving image shown in FIGS. 3A and 3B. The components already explained in FIG. 2 are given the same numerals, and a detailed explanation will be omitted. The same components as those in FIGS. 1A and 1B are given the same numerals. Here, a continuous image consisting of an optional number of images taken within predetermined time is expressed as a moving image.

First, in label [A], an MPEG compressed playback streaming signal output from the HDD 105 (or the memory card 106) is transferred to a map 401 of the SDRAM (memory circuit) 104.

Then, in label [B] and label [C], the data is decoded in the compression/expansion unit (MPEG codec) 103, and converted to a YUV signal for video display, and transferred to a map 402 of the SDRAM 104, as a YUV signal.

The YUV signal, when displayed without modifying, is given OSD (here, the data corresponding to the frame of the sub-screen 22-302 on the display 22-301 and the frame of the magnify position mark 22-303 in FIG. 3A) in the video interface (Video I/F) and OSD (On Screen Display) processor 121, converted to a video signal by the video decoder 107, and displayed in the LCD 22 through the liquid crystal panel driver 108. When displaying in an externally connected display unit, a signal output to a video output (Video Out) terminal can be used.

To create YUV data used for the magnified display, a YUV signal is input to the image (magnification/reduction) processor 131 (label [D]).

The image (magnification/reduction) processor 131 is an engine used to magnify or reduce an image (for full-screen display in a sub-screen), and high-speed processing is possible. In addition, existing techniques, such as bi-linear or bi-cubic interpolation and filtering may be used to increase the image quality. Most of these techniques have conventionally been used for magnification and reduction of a still image.

The image magnified or reduced in the image (magnification/reduction) processor 131 is stored in maps 403 (label [E]) and 404 (label [F]) of the SDRAM (memory circuit) 104.

Namely, in the method of magnifying or reducing an image whenever requested for magnified or reduced display of a playback image in the present invention, an image used for magnified or reduced display is previously prepared and sequentially transferred (output) according to a transfer request. This is simple and low cost. With the recent high-speed (decreased processing speed) hardware structure. (SDRAM), an image can be processed in real time if the size is standard. An image (a moving image or continuous images) displayed in the LCD 22 through the OSD processor 121, or the data corresponding to the frame of the sub-screen 22-302 in the display 22-301 and the frame of the magnify position mark 22-303 in FIG. 3A is sequentially moved when movement in the direction of "up/down/left/right" is instructed (input) from the OK button 27, an area of an original image to be magnified is changed according to the range of moving the frame of the magnify position mark 22-303, and the corresponding magnified or reduced image is sequentially stored in the maps 403 (label [E]) and 404 (label [F]) of the SDRAM 104.

Thereafter, the magnified or reduced image prepared in the maps 403 and 404 of the SDRAM (memory circuit) 104 in the above-mentioned process is output to the video decoder 107 (label [G]) through the video interface and OSD processor 21, with the magnified display screen and sub-screen overlaid on the OSD of a square area calculated by the CPU 111.

Therefore, the LCD 22 displays the sub-screen 22-302 and the OSD image 22-303 overlaid on the sub-screen 22-302, on the already magnified image 22-301 shown in FIG. 3A. In this time, the identifying information (22-303) indicating a magnification changing part is overlaid on a moving image displayed in the display unit (LCD 22), and a magnified image corresponding to the magnification changing part (the image within the frame 22-303) to be displayed in the moving image displayed in the display unit (a plurality of image is stored in the above-mentioned map). When an instruction to change the magnification changing part displayed in the moving image displayed in the display unit and the relative position of the moving image displayed in the display unit is input through the OK button 27, the magnified image corresponding to the magnification changing part is changed according to the relative position instructed to change.

The sub-screen 22-302 can be made translucent, for example (the luminance and color are controlled so that the image is displayed in a transparent state through the magnified image 22-301, and displayed in being overlaid), by controlling the output level from the image (magnification/reduction) processor 131.

The above-mentioned magnified and reduced images utilize the high-speed image data transfer with the SDRAM (memory circuit) 104, and can be easily realized by the above-mentioned simple method.

Playback such as reverse playback, fast forward playback, step playback and slow playback are the processes before the data is stored in the YUV map for video display in the image (magnification/reduction) processor 131 of the present invention, and can be scrolled while maintaining the state of magnified display.

Therefore, magnified display is possible while playing a moving image, and this playback image can be enjoyed. Further, a sub-screen also displays a moving image, and the whole image can be grasped even when magnifying the image. The method is simple, and the cost is not increased.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The embodiment of invention is also applicable to a video camera using a tape as a recording medium, for example, without modifications. A camera may be a still camera for shooting (recording) a still image, using a large capacity memory card as a main recording medium, and an optional external recording medium as an auxiliary recording medium.

What is claimed is:

1. An image reproducing apparatus comprising:
a storage unit configured to hold a moving image;
an input unit configured to provide magnification/reduction of the moving image being reproduced; and
a control unit configured to, when an operation to change magnification of a magnified image is performed via the input unit in a state when reproducing a moving image, create a moving image having a magnification based on an amount provided by the input unit, and perform special reproduction operations while maintaining the magnification,
wherein, when the special reproduction operations are performed, a reduced entire image is simultaneously displayed in the entire image of the magnified part, to indicate which part of the entire image is magnified, and
wherein, the special reproduction operations include reverse reproduction, fast forward reproduction, step reproduction, and slow reproduction.

2. The apparatus of claim 1, wherein the input unit is a zoom bar for performing a zoom-in/zoom-out operation at a time of image pickup.

3. The apparatus of claim 2, wherein the magnification increases when the zoom bar is moved to a tele-conversion side (T side), and the magnification decreases when the zoom bar is moved to a wide angle side (W side).

4. The apparatus of claim 3, wherein during the special reproduction, the magnified and displayed moving image is scrollable.

5. The apparatus of claim 1, further comprising:
a display unit configured to reproduce and display the moving image held in the storage unit.

6. The apparatus of claim 5, wherein the input unit is a zoom bar for performing a zoom-in/zoom-out operation at a time of image pickup.

7. The apparatus of claim 6, wherein the magnification increases when the zoom bar is moved to a tele-conversion side (T side), and the magnification decreases when the zoom bar is moved to a wide angle side (W side).

8. The apparatus of claim 7, wherein during the special reproduction, the magnified and displayed moving image is scrollable.

9. The apparatus of claim 5, wherein during the special reproduction, the magnified and displayed moving image is scrollable.

10. An image reproducing apparatus comprising:
a storage unit configured to hold a moving image:
an input unit configured to provide magnification/reduction of the moving image being reproduced: and
a control unit configured to. when an operation to change magnification of a magnified image is performed via the input unit in a state when reproducing a moving image, create a moving image having a magnification based on an amount provided by the input unit, and perform special reproduction operations while maintaining the magnification,
wherein, when the special reproduction operations are performed, a reduced entire image is simultaneously displayed in the entire image of the magnified part, to indicate which part of the entire whole image is magnified, and wherein during the special reproduction, the magnified and displayed moving image is scrollable.

11. An image reproducing apparatus comprising:
a storage unit configured to hold a moving image;
a display unit configured to reproduce and display the moving image held in the storage unit;
an input unit configured to provide magnification/reduction of the moving image reproduced and displayed in the display unit; and
a display control unit configured to, when an operation for changing a magnification of a magnified image is performed via the input unit in a state where reproduction by the display unit is temporarily stopped, create and display a moving image having a magnification based on an amount provided by the input unit, and perform special reproduction operations while maintaining the magnified display,
wherein, when the special reproduction operations are performed, a reduced entire image is simultaneously displayed in the entire image of the magnified part, to indicate which part of the entire image is magnified.

12. The apparatus of claim 11, wherein the special reproduction operations includes reverse reproduction, fast forward reproduction, step reproduce and slow reproduction.

13. The apparatus of claim 11, wherein the input unit is a zoom bar for performing a zoom-in/zoom-out operation at a time of image pickup.

14. The apparatus of claim 13, wherein the magnification increases when the zoom bar is moved to a tele-conversion side (T side), and the magnification decreases when the zoom bar is moved to a wide angle side (W side).

15. The apparatus of claim 14, wherein during the special reproduce, the magnified and displayed moving image is scrollable.

16. The apparatus of claim 11, wherein during the special reproduction, the magnified and displayed moving image is scrollable.

17. An image reproducing apparatus comprising:
a storage unit configured to hold a moving image;
a display unit configured to reproduce and display the moving image held in the storage unit;
an input unit including a zoom bar for performing a zoom-in/zoom-out operations at a time of image pickup, in which magnification increases when the zoom bar is moved to a tele-conversion side (T side), and magnification decreases when the zoom bar is moved to a wide angle side (W side), the input unit configured to provide magnification/reduction of the moving image reproduced and displayed in the display unit; and
a display control unit configured to, when an operation for changing a magnification of a magnified image is performed via the input unit in a state where reproduction by the display unit is temporarily stopped, create and display a moving image having a magnification based on an amount provided by the input unit, and perform special reproduction operations while maintaining magnified display, and during the special reproduction, the magnified and displayed moving image is scrollable.

* * * * *